April 25, 1961
W. H. PAYNE II, ET AL
2,981,195
FLUID FLOW MOTOR CONTROL
Filed July 8, 1957
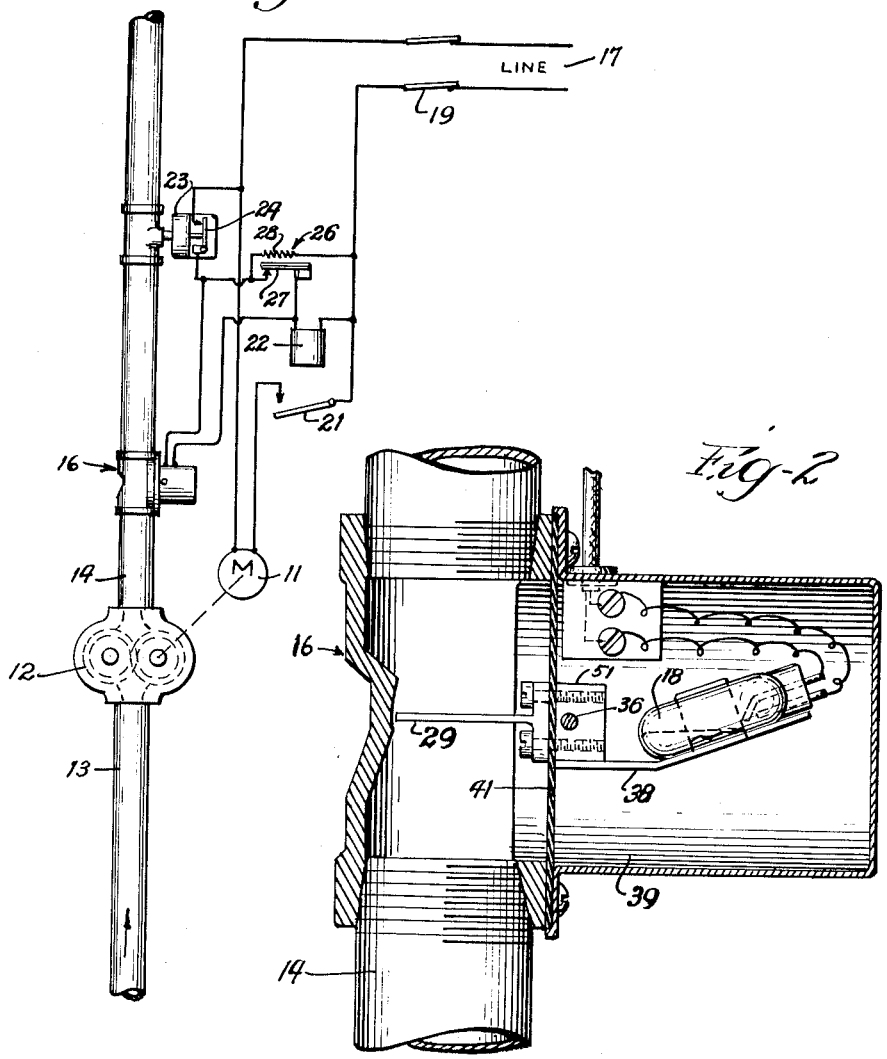
INVENTORS.
William Harvey Payne &
William H. Payne II
By: Jones, Darbo & Robertson
Attys.

2,981,195
Patented Apr. 25, 1961

2,981,195
FLUID FLOW MOTOR CONTROL

William H. Payne II and William Harvey Payne, both of Laurelwood, Pine Hall, N.C.

Filed July 8, 1957, Ser. No. 670,520

2 Claims. (Cl. 103—25)

Although various safety devices have been proposed for well pumps to protect the motor and pumps from damage which will occur if they remain running when they are not pumping, such damage continues to occur. If the safety device fails, the dry operation of the pump may cause it to overheat and be damaged by heat or increased friction, and the motor driving it may burn out due to overload in driving a pump in which the friction has thus been increased. Perhaps many pumps are installed without protection because the cost of this protection combined with the remaining uncertainty of protection do not justify the cost of installation.

According to the present invention a high degree of dependability is attained by using the flow of the liquid as the main determing factor in maintaining the pump motor in operation. A flow-controlled switch is utilized to cause disconnection of the motor from the power circuit if the liquid does not flow when it should. This is made possible by providing a time delay device which prevents such de-energization of the motor for the first few seconds of a pumping operation, or until enough time has passed so that the liquid should have started flowing.

Additional objects and advantages will be apparent from the following description and from the drawings.

Designation of figures

Fig. 1 is a diagrammatic representation of the form of the invention chosen for illustration, showing especially the circuit diagram.

Fig. 2 is a longitudinal sectional view of one form of the flow-controlled switch which may be used in Fig. 1.

Although the following disclosure offered for public dissemination is detailed to ensure adequacy and aid understanding, this is not intended to prejudice that purpose of a patent which is to cover each new inventive concept therein no matter how it may later be disguised by variations in form or additions of further improvements. The claims at the end hereof are intended as the chief aid toward this purpose, as it is these that meet the requirement of pointing out the parts, improvements, or combinations in which the inventive concepts are found.

General description

The invention has been illustrated in connection with a motor 11 and a pump 12, the latter being shown as a gear pump. The pump 12 may be a well pump for drawing water or oil through an intake pipe 13 and pumping it up through an upflow pipe 14. According to the present invention a flow actuated switch unit 16 is provided in or beyond the upflow pipe 14 to actuate a switch whenever the flow of liquid through upflow pipe 14 reaches a chosen value. This value would naturally be chosen as one high enough to ensure safe operation of the pump 12. If for any reason the flow through upflow pipe 14, once started, is discontinued while the motor 11 is still connected to the source of power 17, the flow-controlled switch assembly 16 actuates its switch 18 to cause the motor 11 to be disconnected.

Illustrated circuit

In the illustrated water pump circuit the main or hand controlled switch 19 will normally be closed, and the connection of the motor 11 to the source of power 17 will depend upon switch arm 21 of relay 22. When relay 22 is energized, motor 11 will be connected.

Relay 22 is never energized unless pressure controlled switch unit 23 operates its contact 24 to close the energizing circuit at that point. This will occur when the pressure in the distribution system reaches the low end of its chosen range. At this time, the relay 22 will be energized through a cutout combination in the form of a time delay switch unit 26. The switch at the free end of element 27 of switch unit 26 is normally closed.

The element 27 may be a bimetal arm heated by a heater 28. The heater 28 starts heating when the contact 24 closes. At a chosen length of time after contact 24 closes, heater 28 will have heated the bimetal 27 enough so that this bimetal will open the circuit through it. If water is not flowing up through pipe 14 at that time, this will de-energize relay 22, open contact 21 and disconnect motor 11.

Normally, however, the opening of contact 27 will have no effect. This is because water will have started flowing up through pipe 14 and will swing the flow detector vane 29 in the direction of flow tilting the switch 18 and closing the connection within it. It will be understood that the switch 18 is illustrated as a mercury switch. The connection in switch 18 is in parallel to switch 27 and therefore it maintains relay 22 energized. Normally it will maintain relay 22 energized until the pressure in the distribution system has been built up to the top of its chosen range, when pressure controlled switch 23 will operate its switch 24 to break the energizing circuit. Of course, should the pump 12 run dry in the meantime, it would cease to cause a flow of water through up-pipe 14, and vane 29, being biased to the position shown would return to that position opening the connection in switch 18, de-energizing relay 22, and releasing contact arm 21 to disconnect motor 11.

Circuit variations

Although the illustrated form of circuit has advantages over some others, it will be apparent that the broader aspects of the invention will be utilized even if wide departures are made from the illustrated form of circuit. For example, the pressure controlled switch 23 could be connected in the usual way for such switches, namely with its contacts opening and closing the main motor circuit. The flow-controlled switch could be arranged to be closed when there is no flow instead of being opened when there is no flow, corresponding changes in the circuit being made so that the motor would be disconnected unless the flow-controlled switch 18 were opened after a suitable short interval. The switch 27 may be heated by current passing through it, provided the circuit is so arranged that it cannot re-establish the circuit when it closes until a new pumping cycle has been called for. An entriely different time delay device could be provided.

In short, any circuit can be used which will first be independent of the flow detector so that the motor can start and have time to establish flow if conditions are normal, and will then place control in the flow detector so that if the chosen rate of minimum flow has not been established, or if it ceases, the motor will be disconnected.

Flow-controlled switch

Although the flow-controlled switch may be of the vane type, and such a type has been illustrated in more detail in Fig. 2, other types of flow-controlled switches may be used. However, it is important that the switch unit invariably distinguished between two levels of flow, one being adequate and the other being either inadequate or too low for providing safe tolerance. Accordingly, it is important that this switch unit be one in which the flow detection will operate properly throughout the possible pressure ranges to be encountered which are quite often from sub-atmospheric to 50 to 70 pounds per square inch.

In the form of switch unit shown in Fig. 2 the vane 29 is carried by a spindle 36 which is supported by the side walls of the unit at the ends of the spindle 36. The spindle 36 may turn or the block 37 may turn on the spindle. Arm 38 may extend from block 37 for carrying the mercury switch unit 18. The switch chamber 39 is preferably sealed from the pipe 14 by a rubber or reinforced rubber diaphragm 41, which of course also seals the pipe 14 from the atmosphere.

The amount of flow required to actuate the switch can be varied in several ways. If the housing snugly surrounds the vane throughout the range of movement of the vane until the switch is actuated, a very slight flow will actuate the switch. This can be used in a system of such nature that a slight flow indicates safe operation. If a substantial flow is required for safe operation, the vane should not fit snugly and should have a size such that it would be swung to the extent required for switch actuation only when the amount of flow determined to be necessary for safety had been reached.

If necessary to ensure satisfactory operation of the detector 16, a small hole may be provided through the top of the diaphragm 41, the electrical connections insulated from the water, and the cover 39 sealed.

We claim:

1. The combination of a pipe, a pump pumping a fluid through said pipe, a motor driving said pump, an energizing circuit for said motor, switch means, a pressure responsive device in fluid communication with said pipe and controlling said switch means, said switch means being actuated in the circuit closing direction when the pressure responsive device detects a fall in pressure in said pipe to a predetermined value and said switch means including a main switch in said motor energizing circuit, a cutout combination including a heater circuit in series with a switch of said switch means, and a heater, a bimetal heated by said heater, a safety switch in controlling relationship to said motor energizing circuit and opened by said bimetal when heated to a critical temperature; a vane-type flow responsive circuit-maintaining means associated with said pipe and responsive to a predetermined flow therein, said heater circuit causing said bimetal to open said safety switch a predetermined time after the closing of said switch means, and thereby causing interruption of said motor energizing circuit, except when said circuit-maintaining means is flow-actuated, said circuit-maintaining means including a circuit so connected with said cutout combination as to prevent the effective opening of said safety switch when the circuit-maintaining means is flow-actuated.

2. The combination of a pressure responsive device for association with a water system to be responsive to the pressure therein, a motor energizing circuit, switch means controlled by said pressure responsive device and actuated in the circuit closing direction when the pressure responsive device detects a fall in pressure to a predetermined value, and including a primary switch for closing the motor energizing circuit, a cutout combination including a heater circuit in series with a switch of said switch means, and a heater, a bimetal heated by said heater, a safety switch in controlling relationship to said motor energizing circuit and opened by said bimetal when heated to a critical temperature; a vane-type flow responsive circuit-maintaining means for association with a water pipe to be responsive to a predetermined flow therein, said heater circuit causing said bimetal to open said safety switch a predetermined time after the closing of said switch means, and thereby causing interruption of said motor energizing circuit, except when said circuit-maintaining means is flow-actuated, said circuit-maintaining means including a circuit so connected with said cutout combination as to prevent the effective opening of said safety switch when the circuit-maintaining means is flow-actuated.

References Cited in the file of this patent

UNITED STATES PATENTS

| | | |
|---|---|---|
| 868,464 | Mann | Oct. 15, 1907 |
| 1,784,205 | Seeger | Dec. 9, 1930 |
| 1,842,295 | Schurle | Jan. 19, 1932 |
| 1,980,799 | Hardesty | Nov. 13, 1934 |
| 2,275,066 | Otterbourg | Mar. 3, 1942 |
| 2,461,076 | Neeson | Feb. 8, 1949 |
| 2,475,850 | Moore et al. | July 12, 1949 |
| 2,550,093 | Smith | Apr. 24, 1951 |
| 2,749,495 | Walley | June 5, 1956 |
| 2,774,929 | Schaefer | Dec. 18, 1956 |